(12) United States Patent
Uematsu et al.

(10) Patent No.: US 11,880,069 B2
(45) Date of Patent: Jan. 23, 2024

(54) OPTICAL FIBER SIDE INPUT AND OUTPUT DEVICE

(71) Applicant: NIPPON TELEGRAPH AND TELEPHONE CORPORATION, Tokyo (JP)

(72) Inventors: Takui Uematsu, Musashino (JP); Hiroyuki Iida, Musashino (JP); Hidenobu Hirota, Musashino (JP); Naotsugu Ambe, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 248 days.

(21) Appl. No.: 17/422,911

(22) PCT Filed: Jan. 6, 2020

(86) PCT No.: PCT/JP2020/000008
§ 371 (c)(1),
(2) Date: Jul. 14, 2021

(87) PCT Pub. No.: WO2020/149156
PCT Pub. Date: Jul. 23, 2020

(65) Prior Publication Data
US 2022/0066101 A1    Mar. 3, 2022

(30) Foreign Application Priority Data

Jan. 17, 2019  (JP) .................................. 2019-005973

(51) Int. Cl.
*G02B 6/28* (2006.01)
*G02B 6/38* (2006.01)

(52) U.S. Cl.
CPC ......... *G02B 6/2852* (2013.01); *G02B 6/3802* (2013.01)

(58) Field of Classification Search
CPC ............................ G02B 6/2852; G02B 6/3802
See application file for complete search history.

(56) References Cited

U.S. PATENT DOCUMENTS

| 5,333,217 A | * | 7/1994 | Kossat | G02B 6/4289 |
| | | | | 385/32 |
| 5,708,499 A | * | 1/1998 | Baden | G02B 6/14 |
| | | | | 356/73.1 |
| 2011/0217004 A1 | * | 9/2011 | Niimi | G02B 6/2852 |
| | | | | 385/32 |

FOREIGN PATENT DOCUMENTS

| JP | S61181345 U | 11/1986 |
| JP | 201540916 A | 3/2015 |
| JP | 201778795 A | 4/2017 |

* cited by examiner

*Primary Examiner* — Sung H Pak
*Assistant Examiner* — Hoang Q Tran
(74) *Attorney, Agent, or Firm* — Harness, Dickey & Pierce, P.L.C.

(57) ABSTRACT

An object is to provide a highly versatile local-light detection apparatus for an optical fiber capable of supporting various types of coated optical fibers.
A local-light detection apparatus for an optical fiber according to the present invention includes a first jig including a recess curved in a longitudinal direction of a coated optical fiber and an optical input and output device configured to make light incident on the coated optical fiber in which a bend is formed and to receive light leaking from the coated optical fiber, a second jig including a protrusion curved in the longitudinal direction of the coated optical fiber, the protrusion being configured to sandwich the coated optical fiber between the recess of the first jig and the protrusion, a presser configured to apply a pressing force in a direction in which the recess of the first jig and the protrusion of the second jig approach each other and to form the bend in the coated optical fiber, and fiber guides disposed at both ends (Continued)

of the recess of the first jig in the longitudinal direction of the coated optical fiber, and to arrange the coated optical fiber on a predetermined path on the recess of the first jig regardless of a diameter of the coated optical fiber when the presser forms the bend in the coated optical fiber.

20 Claims, 2 Drawing Sheets

OPTICAL FIBER SIDE INPUT AND OUTPUT DEVICE

CROSS-REFERENCE TO RELATED APPLICATIONS

This application is a 371 U.S. National Phase of International Application No. PCT/JP2020/000008 filed on Jan. 6, 2020, which claims priority to Japanese Application No. 2019-005973 filed on Jan. 17, 2019. The entire disclosures of the above applications are incorporated herein by reference.

TECHNICAL FIELD

The present disclosure relates to a local-light injection and detection apparatus for an optical fiber that is configured to input and output light through the side of a bent coated optical fiber.

BACKGROUND ART

As techniques for inputting and outputting optical signals into and from an optical fiber without cutting the optical fiber, a local-light injection and detection technique for an optical fiber has been studied, in which an existing optical fiber (working optical fiber) is bent, another optical fiber (probe optical fiber) is placed to face the bent part from a side surface, an optical signal is injected from a tip end of the probe optical fiber, and an optical signal emitted from the working optical fiber is received at the tip end of the probe optical fiber (see, for example, Patent Literature 1).

CITATION LIST

Patent Literature

Patent Literature 1: JP 2015-040916 A

SUMMARY OF THE INVENTION

Technical Problem

Various types of coated optical fibers are laid at connection points for existing lines, and such connection points are one example to which the local-light injection and detection technique is mainly applied. Even in the case of a single-core coated fiber, it includes a variety of outer diameters of 0.25 mm, 0.5 mm, and 0.9 mm. In a known technique, an optimal bent shape is designed in accordance with a coated optical fiber to which the local-light detection technique is applied. Thus, to support all the types of single-core coated fibers, an operator is required to prepare local-light detection apparatuses dedicated for the respective types of single-core coated fibers and perform operations while switching among the apparatuses in accordance with the coated fiber types. In other words, the type of coated optical fiber that can be supported by each of the known local-light detection apparatuses is determined, which results in a lack of versatility.

Therefore, in order to solve the problem described above, an object of the present invention is to provide a highly versatile local-light detection apparatus for an optical fiber capable of supporting various types of coated optical fibers.

Means for Solving the Problem

In order to achieve the above object, a local-light detection apparatus for an optical fiber according to the present invention has a mechanism in which a width of a groove of a fiber guide guiding an optical fiber to recessed and protruding jigs that bend and fix the optical fiber is narrowed toward the recessed jig, and a position of a center axis of the coated optical fiber matches a position of a center axis of an optical input and output device.

Specifically, a local-light detection apparatus for an optical fiber according to the present invention includes a first jig including a recess curved in a longitudinal direction of a coated optical fiber and an optical input and output device configured to make light incident on the coated optical fiber in which a bend is formed and to receive light leaking from the coated optical fiber, a second jig including a protrusion curved in the longitudinal direction of the coated optical fiber, the protrusion being configured to sandwich the coated optical fiber between the recess of the first jig and the protrusion, a presser configured to apply a pressing force in a direction in which the recess of the first jig and the protrusion of the second jig approach each other and to form the bend in the coated optical fiber, and fiber guides disposed at both ends of the recess of the first jig in the longitudinal direction of the coated optical fiber, and to arrange the coated optical fiber on a predetermined path on the recess of the first jig regardless of a diameter of the coated optical fiber when the presser forms the bend in the coated optical fiber.

The local-light detection apparatus for the optical fiber according to the present invention includes the fiber guide. Thus, the coated optical fiber can be disposed on a predetermined path on the recess of the first jig regardless of a diameter of the coated optical fiber. Thus, the present invention can provide a highly versatile local-light detection apparatus for an optical fiber capable of supporting various types of coated optical fibers.

Note that the predetermined path includes an optical input and output part of the optical input and output device on the recess of the first jig.

The fiber guide preferably has a groove into which the coated optical fiber is inserted from a pressing direction of the pressing force applied by the presser. The groove has a shape in which both walls equally approach each other and a width of the groove narrows in a depth direction of the groove. Furthermore, the width of the groove at a maximum width part is greater than a diameter of the coated optical fiber having a maximum thickness, and the width of the groove at a minimum width part is smaller than a diameter of the coated optical fiber having a minimum thickness. The groove can determine the position of the coated optical fiber and place the coated optical fiber on the predetermined path. The grooves, which are tapered, can support coated optical fibers having different diameters.

In the local-light detection apparatus for the optical fiber according to the present invention, the second jig and the fiber guide are disposed such that a gap created between the second jig and the fiber guide when the presser applies no pressing force is greater than the diameter of the coated optical fiber having the maximum thickness. The coated optical fiber can be inserted into the groove of the fiber guide from the gap.

In the local-light detection apparatus for the optical fiber according to the present invention, when the pressing direction of the presser is defined as a Y-axis, a longitudinal direction of the coated optical fiber is defined as a Z-axis, and a direction orthogonal to the pressing direction of the presser and the longitudinal direction of the coated optical fiber is defined as an X-axis, the width of the groove is preferably smaller than the diameter of the coated optical fiber having a minimum thickness at any position from a top of the recess of the first jig to a top of the protrusion of the second jig in the Y-axis direction when the presser forms the bend in the coated optical fiber.

Effects of the Invention

The present invention can provide a highly versatile local-light detection apparatus for an optical fiber capable of supporting various types of coated optical fibers.

DESCRIPTION OF EMBODIMENTS

Embodiments of the present invention will be described with reference to the accompanying drawings. The embodiments described below are examples of the present invention, and the present invention is not limited to the embodiments described below. In the present specification and the drawings, the same components are designated by the same reference signs.

Figure 1:
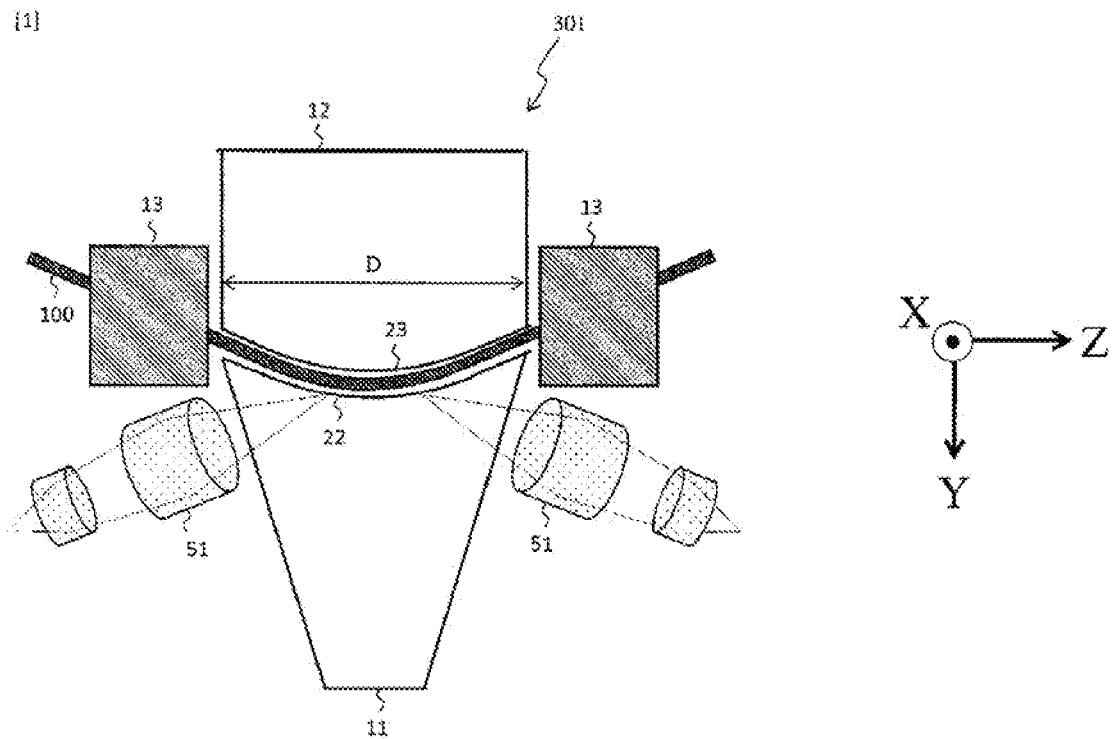
FIG. 1 is a top view of a local-light detection apparatus for an optical fiber according to the present invention.
Figure 2:
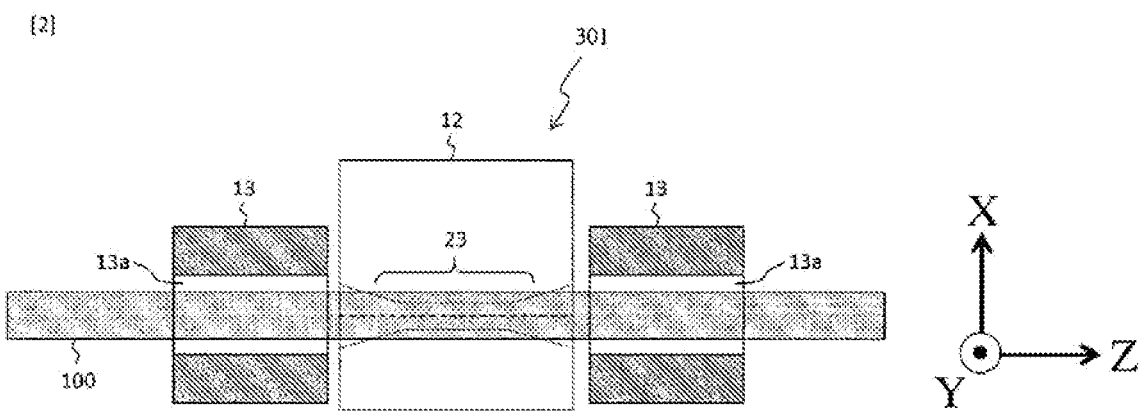
FIG. 2 is a side view of the local-light detection apparatus for the optical fiber according to the present invention.
Figure 3:
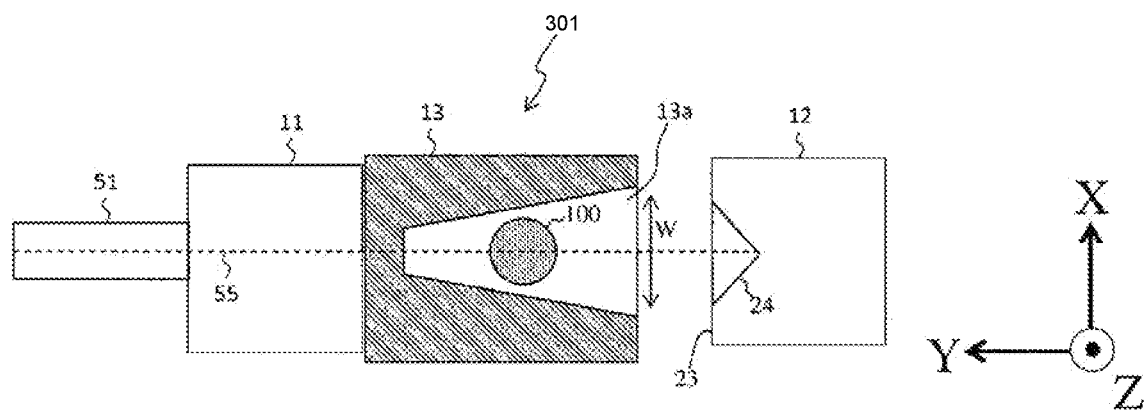
FIG. 3 is a side view of the local-light detection apparatus for the optical fiber according to the present invention.

FIGS. 1, 2, and 3 are a top view (as viewed from a positive side toward a negative side in an X direction), a side view (as viewed from a positive side toward a negative side in a Y direction), and a side view (as viewed from a positive side toward a negative side in a Z direction) illustrating an optical fiber input and output apparatus 301 according to the present embodiment, respectively. The optical fiber input and output apparatus 301 includes a first jig 11, a second jig 12, a presser (not illustrated), and fiber guides 13.

The first jig 11 has a recess 22 that curves in the longitudinal direction of a coated optical fiber 100, and an optical input and output device 51 that makes light incident on the coated optical fiber 100 that has been bent and receives light leaked from the coated optical fiber 100.

The second jig 12 has a protrusion 23 that curves in the longitudinal direction of the coated optical fiber 100 and sandwiches the coated optical fiber 100 between the recess 22 of the first jig 11 and the protrusion 23.

The presser (not illustrated) applies a pressing force in a direction in which the recess 22 of the first jig 11 and the protrusion 23 of the second jig 12 approach each other, thereby bending the coated optical fiber 100.

The fiber guides 13 are disposed at both ends of the recess 22 of the first jig 11 in the longitudinal direction of the coated optical fiber 100. Furthermore, when the presser forms a bend in the coated optical fiber 100, the fiber guides 13 position the coated optical fiber 100 on a predetermined path on the recess 22 of the first jig 11, regardless of a diameter of the coated optical fiber 100.

The coated optical fiber 100 is sandwiched between the first jig 11 and the second jig 12 to form a bend in the coated optical fiber 100. This bent part is used for the optical input and output device 51 to input and output light. The fiber guides 13 are provided at both ends of the bent part (both ends of the recess 22 of the first jig 11). The second jig 12 is pressed onto the first jig 11 (a bend is formed), and the coated optical fiber 100 is guided by the fiber guides 13 onto a predetermined path on the recess 22 of the first jig 11. Note that the second jig 12 has a groove 24 that prevents the coated optical fiber 100 from shifting from a center line 55 during pressing.

The optical input and output device 51 is, for example, a lens that focuses light from a probe fiber (not illustrated), makes the light incident on the bent part of the coated optical fiber 100, focuses light that leaks from the bent part of the coated optical fiber 100, and makes the light incident on the probe fiber. Thus, an optical input and output part (where light from the probe fiber is focused) of the optical input and output device 51 on the recess 22 of the first jig 11 is desirably included in the predetermined path.

The fiber guides 13 desirably guide the coated optical fiber 100 such that a height of a center axis of the coated optical fiber 100 matches a height of a center axis of the optical input and output device 51 as indicated by the center line 55 in FIG. 3. Thus, for example, each fiber guide 13 preferably has a groove 13a into which the coated optical fiber 100 is inserted from a pressing direction of the pressing force applied by the presser. A width W of the groove 13a is wider than a maximum outer diameter of the coated optical fiber 100 to be stored such that the coated optical fiber 100 of various outer diameters can be stored.

Further, for example, both walls of the groove 13a equally approach each other and the width of the groove 13a narrows toward a depth direction (Y direction). As illustrated in FIG. 3, both walls of the groove 13a are symmetrical with respect to the center line 55 in the X direction, and the width W narrows toward the positive side in the Y direction. Here, the width W of the groove 13a is greater than the diameter of the coated optical fiber 100 having a maximum thickness at a maximum width part (the negative side in a Y-axis in FIG. 3), and is smaller than the diameter of the coated optical fiber 100 having a minimum thickness (the positive side in the Y-axis in FIG. 3) at a minimum width part.

This structure allows the center axis of the coated optical fiber 100 to match the center axis of the optical input and output device 51 at the center line 55 regardless of the outer diameter of the coated optical fiber 100. FIG. 3 illustrates an example in which a sectional shape of the groove 13a in an X-Y plane is trapezoidal. However, the same effect can be achieved for any other shape as long as the sectional shape is line-symmetric with respect to the center line 55 and the width W is tapered (with one end being wider and the other end being narrower).

Figure 4:
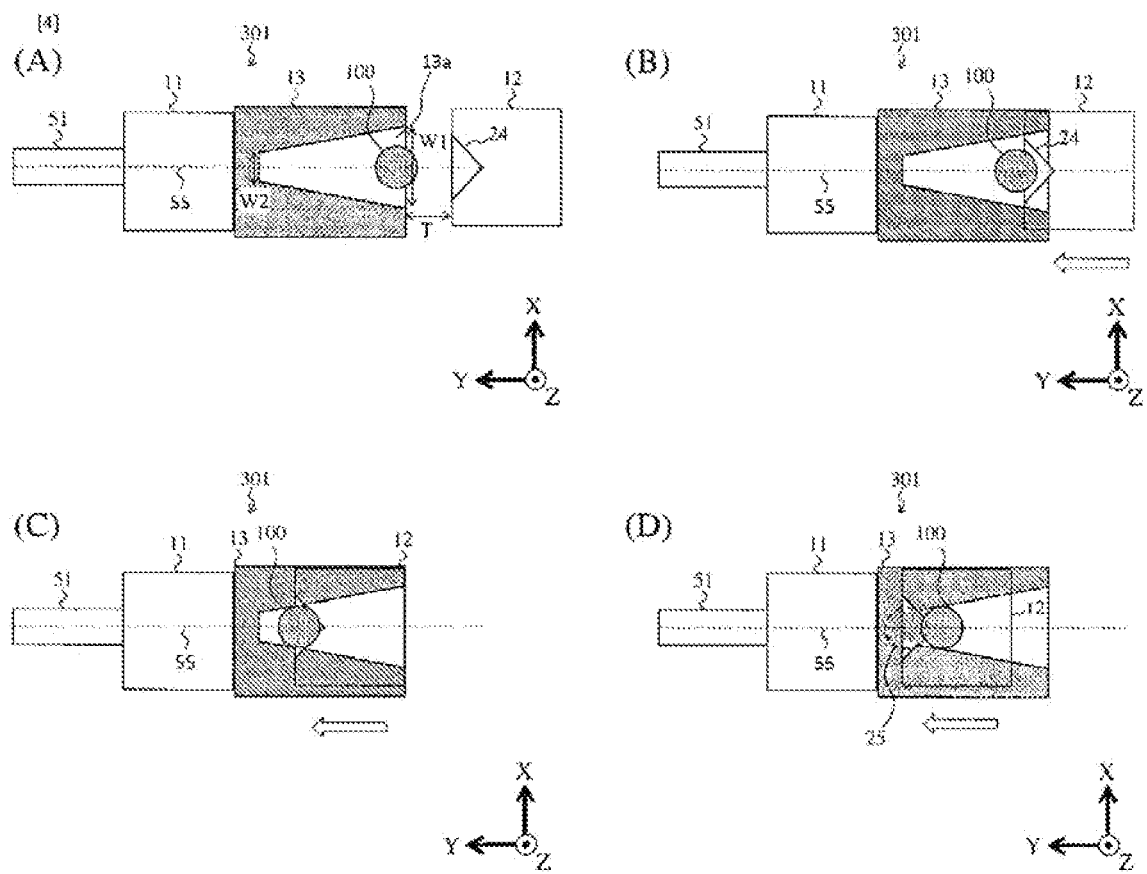
FIG. 4 is a side view illustrating operations of the local-light detection apparatus for the optical fiber according to the present invention.

FIG. 4 is a diagram illustrating operations of the optical fiber input and output apparatus 301. In the following description regarding the optical fiber input and output apparatus 301 according to the present example, the coated optical fiber 100 having an outer diameter from Amin to Amax is subjected to the operations, and the groove 13a includes the fiber guide 13 of a trapezoidal structure. FIG. 4(A) is a diagram illustrating a state before a pressing force is applied to the second jig 12. FIG. 4(B) is a diagram illustrating a state in which a pressing force is applied to the second jig 12 and the coated optical fiber 100 starts to be pressed into the first jig 11. FIG. 4(C) is a diagram illustrating a state in which a pressing force is applied to the second jig 12 and the coated optical fiber 100 contacts both walls of the groove 13a. FIG. 4(D) is a diagram illustrating a state in which the coated optical fiber 100 is bent.

The fiber guides 13 satisfy the following conditions.

Without a pressing force being applied, a gap T created between the second jig 12 and the fiber guide 13 in the Y direction is greater than or equal to Amax (for storing the coated fiber 100 in the groove 13a).

Both walls of the groove 13a are symmetrical with respect to the center line 55.

The width of the groove 13a narrows toward the positive side in the Y direction (W2<W1).

A maximum width W1 of the groove 13a is greater than or equal to Amax, and a minimum width W2 is less than or equal to Amin.

The groove 13a has a width of Amin on the positive side in the Y direction with respect to the bent part 25.

The last condition will be further described below. The last condition means that the width of a bottom of the groove 13a is smaller than the diameter of the coated optical fiber having a minimum thickness at any position from a top of the recess 22 of the first jig 11 to a top of the protrusion 23 of the second jig 12 in the Y-axis direction when the presser forms a bend 25 in the coated optical fiber 100. When the coated optical fiber 100 is pushed by the protrusion 23 of the second jig 12 (advances in the Y direction), the coated optical fiber 100 contacts both walls of the groove 13a at a position illustrated in FIG. 4(C). The width of the groove 13a narrows toward the Y direction, and thus, even if the protrusion 23 of the second jig 12 pushes the coated optical fiber 100 further from the state illustrated in FIG. 4(C), the coated optical fiber 100 does not move in the Y direction in the groove 13a. However, at a section where the fiber guide 13 is not present (width D in FIG. 1), the coated fiber 100 is pushed further by the protrusion 23 of the second jig 12, and the bend 25 is formed between the protrusion 23 of the second jig 12 and the recess 22 of the first jig 11. This state is represented in FIG. 4 (D).

The groove 13a of each fiber guide 13 configured as described above causes the coated optical fiber 100 having a smaller outer diameter to be guided toward a deeper side of the groove (positive side of the Y direction). The coated optical fiber 100 is therefore always guided onto the predetermined path (center line 55) regardless of the outer diameter of the coated optical fiber 100. As a result, an operator can guide the coated optical fiber 100 to the predetermined path accurately, quickly, and efficiently by simply storing the coated optical fiber 100 within the groove of each fiber guide 13 regardless of the type of the coated optical fiber 100.

REFERENCE SIGNS LIST

11 First jig
12 Second jig
13 Fiber guide
13a Groove
22 Recess curved surface
23 Protrusion curved surface
24 Groove
25: Bend
51 Optical input and output device
55 Center line
100 Coated optical fiber
301 Local-light injection and detection apparatus for an optical fiber

The invention claimed is:

1. An optical fiber lateral input and output apparatus comprising:
a first jig including:
a recess curved in a longitudinal direction of a coated optical fiber, and
an optical input and output device configured to make light to be incident on the coated optical fiber in which a bend is formed and to receive light leaking from the coated optical fiber;
a second jig including:
a protrusion curved in the longitudinal direction of the coated optical fiber, the protrusion being configured to clamp the coated optical fiber with the recess of the first jig; and
a guide groove formed in a curved surface of the protrusion, the coated optical fiber being guided into the guide groove;
a presser configured to apply a pressing force in a pressing direction in which the recess of the first jig and the protrusion of the second jig approach each other and to form the bend in the coated optical fiber; and
first and second fiber guides disposed at opposite ends of the recess of the first jig in the longitudinal direction of the coated optical fiber, respectively, and configured to guide the coated optical fiber on a predetermined path on the recess of the first jig regardless of a diameter of the coated optical fiber when the presser forms the bend in the coated optical fiber, each of the first and second fiber guides has another groove,
wherein a first width of the guide groove is smaller than each of second and third widths of the guide groove, and
the first width is located at a tip area of the protrusion of the second jig, and the second and third widths are located at opposite ends of the guide groove, respectively, and
a fourth width of the another groove at an opening of the another groove is larger than each of the second and third widths.

2. The optical fiber lateral input and output apparatus according to claim 1,
wherein the predetermined path includes an optical input and output part of the optical input and output device on the recess of the first jig.

3. The optical fiber lateral input and output apparatus according to claim 1,
wherein the coated optical fiber is inserted into the another groove along the pressing direction of the pressing force applied by the presser.

4. The optical fiber lateral input and output apparatus according to claim 1,
wherein the another groove has a shape in which opposite walls equally approach to each other, and the fourth width of the another groove narrows in a depth direction of the another groove.

5. The optical fiber lateral input and output apparatus according to claim 1,
wherein the fourth width of the another groove at the opening of the another groove is greater than a diameter of the coated optical fiber having a maximum thickness, and
the fourth width of the another groove at a bottom of the another groove is smaller than the diameter of the coated optical fiber having a minimum thickness.

6. The optical fiber lateral input and output apparatus according to claim 1,
wherein the second jig and each of the first and second fiber guides are disposed such that a gap along the pressing direction, when viewed in the longitudinal direction of the coated optical fiber, created between the second jig and each of the first and second fiber guides when the presser applies no pressing force is greater than a diameter of the coated optical fiber having a maximum thickness.

7. The optical fiber lateral input and output apparatus according to claim 1,
wherein when the pressing direction of the presser is defined as a Y-axis, the longitudinal direction of the coated optical fiber is defined as a Z-axis, and a direction orthogonal to the pressing direction and the longitudinal direction of the coated optical fiber is defined as an X-axis, the fourth width of the another groove is smaller than a diameter of the coated optical fiber having a minimum thickness at any position from a top of the recess of the first jig to a top of the protrusion of the second jig along the Y-axis when the presser forms the bend in the coated optical fiber.

8. The optical fiber lateral input and output apparatus according to claim 1,
wherein the recess of the first jig is formed at an entirety of a width of the first jig along the longitudinal direction of the coated optical fiber,
the protrusion of the second jig is formed at an entirety of a width of the second jig along the longitudinal direction of the coated optical fiber,
the guide groove in the curved surface of the protrusion of second jig is formed at the entirety of the width of the second jig along the longitudinal direction of the coated optical fiber, and
the first width of the guide groove is smaller than a diameter of the coated optical fiber, and each of the second and third widths is larger than the diameter of the coated optical fiber.

9. The optical fiber lateral input and output apparatus according to claim 8,
wherein a value of the first width at the tip area of the protrusion of the second jig is constant, and
a value of each of the second and third widths gradually decreases from one of the opposite ends of the guide groove toward the tip area of the protrusion of the second jig.

10. The optical fiber lateral input and output apparatus according to claim 2,
wherein the recess of the first jig is formed at an entirety of a width of the first jig along the longitudinal direction of the coated optical fiber,
the protrusion of the second jig is formed at an entirety of a width of the second jig along the longitudinal direction of the coated optical fiber,
the guide groove in the curved surface of the protrusion of second jig is formed at the entirety of the width of the second jig along the longitudinal direction of the coated optical fiber, and
the first width of the guide groove is smaller than a diameter of the coated optical fiber, and each of the second and third widths is larger than the diameter of the coated optical fiber.

11. The optical fiber lateral input and output apparatus according to claim 10,
wherein a value of the first width at the tip area of the protrusion of the second jig is constant, and
a value of each of the second and third widths gradually decreases from one of the opposite ends of the guide groove toward the tip area of the protrusion of the second jig.

12. The optical fiber lateral input and output apparatus according to claim 3,
wherein the recess of the first jig is formed at an entirety of a width of the first jig along the longitudinal direction of the coated optical fiber,
the protrusion of the second jig is formed at an entirety of a width of the second jig along the longitudinal direction of the coated optical fiber,
the guide groove in the curved surface of the protrusion of second jig is formed at the entirety of the width of the second jig along the longitudinal direction of the coated optical fiber, and
the first width of the guide groove is smaller than a diameter of the coated optical fiber, and each of the second and third widths is larger than the diameter of the coated optical fiber.

13. The optical fiber lateral input and output apparatus according to claim 12,
wherein a value of the first width at the tip area of the protrusion of the second jig is constant, and
a value of each of the second and third widths gradually decreases from one of the opposite ends of the guide groove toward the tip area of the protrusion of the second jig.

14. The optical fiber lateral input and output apparatus according to claim 4,
wherein the recess of the first jig is formed at an entirety of a width of the first jig along the longitudinal direction of the coated optical fiber,
the protrusion of the second jig is formed at an entirety of a width of the second jig along the longitudinal direction of the coated optical fiber,
the guide groove in the curved surface of the protrusion of second jig is formed at the entirety of the width of the second jig along the longitudinal direction of the coated optical fiber, and
the first width of the guide groove is smaller than a diameter of the coated optical fiber, and each of the second and third widths is larger than the diameter of the coated optical fiber.

15. The optical fiber lateral input and output apparatus according to claim 14,
wherein a value of the first width at the tip area of the protrusion of the second jig is constant, and
a value of each of the second and third widths gradually decreases from one of the opposite ends of the guide groove toward the tip area of the protrusion of the second jig.

16. The optical fiber lateral input and output apparatus according to claim 5,
wherein the recess of the first jig is formed at an entirety of a width of the first jig along the longitudinal direction of the coated optical fiber,
the protrusion of the second jig is formed at an entirety of a width of the second jig along the longitudinal direction of the coated optical fiber,
the guide groove in the curved surface of the protrusion of second jig is formed at the entirety of the width of the second jig along the longitudinal direction of the coated optical fiber, and
the first width of the guide groove is smaller than the diameter of the coated optical fiber, and each of the second and third widths is larger than the diameter of the coated optical fiber.

17. The optical fiber lateral input and output apparatus according to claim 16,
wherein a value of the first width at the tip area of the protrusion of the second jig is constant, and a value of each of the second and third widths gradually decreases from one of the opposite ends of the guide groove toward the tip area of the protrusion of the second jig.

18. The optical fiber lateral input and output apparatus according to claim 6,
wherein the recess of the first jig is formed at an entirety of a width of the first jig along the longitudinal direction of the coated optical fiber,
the protrusion of the second jig is formed at an entirety of a width of the second jig along the longitudinal direction of the coated optical fiber,
the guide groove in the curved surface of the protrusion of second jig is formed at the entirety of the width of the second jig along the longitudinal direction of the coated optical fiber, and
the first width of the guide groove is smaller than the diameter of the coated optical fiber, and each of the second and third widths is larger than the diameter of the coated optical fiber.

19. The optical fiber lateral input and output apparatus according to claim 18,
wherein a value of the first width at the tip area of the protrusion of the second jig is constant, and
a value of each of the second and third widths gradually decreases from one of the opposite ends of the guide groove toward the tip area of the protrusion of the second jig.

20. The optical fiber lateral input and output apparatus according to claim 7,
wherein the recess of the first jig is formed at an entirety of a width of the first jig along the longitudinal direction of the coated optical fiber,
the protrusion of the second jig is formed at an entirety of a width of the second jig along the longitudinal direction of the coated optical fiber,
the guide groove in the curved surface of the protrusion of second jig is formed at the entirety of the width of the second jig along the longitudinal direction of the coated optical fiber,
the first width of the guide groove is smaller than the diameter of the coated optical fiber, and each of the second and third widths is larger than the diameter of the coated optical fiber,
a value of the first width at the tip area of the protrusion of the second jig is constant, and
a value of each of the second and third widths gradually decreases from one of the opposite ends of the guide groove toward the tip area of the protrusion of the second jig.

\* \* \* \* \*